United States Patent
Krize et al.

(10) Patent No.: US 10,236,627 B1
(45) Date of Patent: Mar. 19, 2019

(54) ELECTRICAL CONNECTORS FOR LIGHTING AND THE LIKE

(71) Applicant: Christmas Northeast, Inc., Trumbull, CT (US)

(72) Inventors: Anthony Krize, Redwood City, CA (US); Matthew Ryder, Attleboro, MA (US)

(73) Assignee: Christmas Northeast, Inc., Trumbull, CT (US)

( * ) Notice: Subject to any disclaimer, the term of this patent is extended or adjusted under 35 U.S.C. 154(b) by 0 days.

(21) Appl. No.: 16/108,642

(22) Filed: Aug. 22, 2018

Related U.S. Application Data

(60) Provisional application No. 62/679,088, filed on Jun. 1, 2018.

(51) Int. Cl.

| | |
|---|---|
| *H01R 13/60* | (2006.01) |
| *H01R 13/62* | (2006.01) |
| *H01K 1/44* | (2006.01) |
| *F21V 19/00* | (2006.01) |
| *H01R 33/05* | (2006.01) |
| *F21V 21/096* | (2006.01) |
| *F21V 23/06* | (2006.01) |
| *H02G 3/08* | (2006.01) |
| *H01R 33/94* | (2006.01) |
| *F21Y 115/10* | (2016.01) |

(52) U.S. Cl.
CPC ..... *H01R 13/6205* (2013.01); *F21V 19/0035* (2013.01); *F21V 21/096* (2013.01); *F21V 23/06* (2013.01); *H01K 1/44* (2013.01); *H01R 33/05* (2013.01); *H01R 33/94* (2013.01); *H02G 3/08* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 8,794,980 B2* | 8/2014 | McCormack | H01R 13/6205 439/39 |
| 8,936,472 B1* | 1/2015 | Gibboney, Jr. | H01R 13/64 439/39 |
| 9,614,322 B1* | 4/2017 | Gibboney, Jr. | H01R 13/64 |
| 9,899,813 B1* | 2/2018 | Gibboney, Jr. | H02G 3/0487 |
| 10,014,624 B2* | 7/2018 | Chun | H01R 13/6205 |

* cited by examiner

*Primary Examiner* — Tho D Ta
(74) *Attorney, Agent, or Firm* — Nexsen Pruet, LLC; Michael A. Mann

(57) ABSTRACT

An electric light including a lamp base and lamp housing with electrical connectors that are closed by magnetic attraction when polarity is correct. The lamp base is held physically in place in the lamp housing by the magnetic attraction of two pair of magnets without the need of a threaded connection. The magnet pairs hold the lamp base to the lamp housing in a fixed orientation allowing electricity to flow through the terminals in the lamp housing regardless of whether the source of electrical current is direct or alternating, and, if direct current is the source, such as electrical current from solar cells or batteries, preserves polarity, and can deliver direct current when the light source uses direct current, such as LEDs.

18 Claims, 19 Drawing Sheets

ELECTRICAL CONNECTORS FOR LIGHTING AND THE LIKE

TECHNOLOGY FIELD

This disclosure relates to electric lighting, and, more specifically to electrical connectors used with a light source such as light emitting diodes.

BACKGROUND

The "Edison" light was invented over a century ago. See U.S. Pat. No. 223,898 (1880); U.S. Pat. No. 317,631 (1885); and U.S. Pat. No. 438,310 (1890). The electric light bulb and socket transformed civilization.

Several alternative forms of lighting have become available since the Edison light, such as fluorescent lighting, used extensively to provide area lighting in offices, laboratories, and factories. More recently, light-emitting diodes (LEDs) are being used as a source of cooler, more energy-efficient light. LEDs are solid-state devices that emit light when direct current is applied across the diode's two terminals. LEDs are used for home and office lighting and instrumentation.

Because of the prevalence of Edison-light-based lighting, fluorescent light tubes, reformed as compact fluorescent tubes, and LEDs have been adapted to fit into Edison bulb bases to accelerate the adoption of these lighting sources. LEDs are also used in a wide range of instrumentation lighting applications where Edison light bulb and socket constraints are much less entrenched.

For most lamps, which is used herein to refer to lighting sources such as table lamps, ceiling lamps (including recessed ceiling lighting), and wall lamps, the Edison bulb continues to be used. The term lamp thus includes the light source with its attached lamp base and a lamp housing that connects the lamp base to a source of electrical current. The light source includes the partially translucent or transparent base that inserts into a lamp housing.

A lamp housing ranges from those that are mostly functional such as recessed ceiling-mounted "cans" with a decorative rim to cover the space between the can and the hole in the ceiling for the can, to a decorative, even highly decorative lamp housing, such as a Tiffany lamp. Electrical power is provided to a lamp housing via an electrical cord from a source of alternating electrical current such as a wall outlet, or via a two-wire power cord in the ceiling that is electrically connected to the lamp base through its housing. Two energized terminals inside the lamp housing serve to transfer electricity to the light source via the lamp base. The lamp base will have two electrical terminals, one terminal for each of the two electrical terminals in the lamp housing.

Compact fluorescent light sources and LED light sources have been adapted with a base that can be threaded into an Edison-type lamp housings and to use household alternating current to energize these light sources through the terminals in the lamp base, which include a first terminal in the center of the bottom of the lamp base and the metal threaded collar around the bottom of the lamp base.

The threading of the Edison housing and Edison lamp base serves two purposes. Threads holds the lamp base to the lamp housing. No clamp or fixture is used to hold one to the other. Also, the mating of the threaded lamp base and lamp housing completes the electrical circuit by using the metal threaded collar to complete one of the legs of the electrical circuit.

Other versions of the Edison socket and lamp base have been developed. For example, A. P. Buquor received two patents, U.S. Pat. No. 2,903,677 and U.S. Pat. No. 2,788,501, issued in 1957, use a magnetic connector to close and hold one leg of the circuit at the bottom of an otherwise Edison-type bulb base threaded to an Edison-type lamp housing.

There remains a need for better LED lighting fixtures that can be driven by more than one source of electrical current.

SUMMARY

Briefly and according to its major aspects, herein is disclosed an electric light including a lamp base and lamp housing. The lamp base is held securely in place in the lamp housing by two pair of magnets, without the use of threads on the lamp housing or lamp base. Also, the magnets hold the lamp base to the lamp housing in a fixed orientation so that the polarity of the electricity flowing through the terminals in the lamp housing is preserved across the terminals in the lamp base. Preserving polarity may be useful when the source of electricity is direct current, such as solar cells or batteries, or when the light source uses direct current, such as LEDs.

Additionally, the present lamp housing may be physically and electrically associated with a junction box that receives electrical current from an electrical source of alternating current and that converts that current, if and as appropriate, to direct current used by the LEDs of the lamp or other electrical load. For example, the source of the electric power to the junction box may be household alternating current that is rectified for use by an LED light source, or it may be direct current supplied, for example, directly by batteries or solar cells.

The present lamp includes at least one LED, and more likely a plurality of surface-mounted LEDs positioned to direct light through a lens and a diffuser. The LEDs a first electrical contact and a second electrical contact. A plurality of LEDs may be interconnected electrically to have a first electrical terminal and a second electrical terminal in order to receive a direct current voltage across the two terminals of the lamp base. A direct current voltage applied across the first electrical terminal and the second electrical terminal causes the LED, or the plurality of LEDs, to emit light.

The present lamp includes a lamp base with two holes therein. There is a first terminal electrically connected to the first electrical contact of the LED plurality by an electrical conductor, such as a wire, and positioned at a first hole in the lamp base; and there is a second terminal electrically connected to the second electrical contact of the LED plurality by another electrical conductor, also likely a wire, and positioned at a second hole in the lamp base. In the first hole is a first magnet; in the second hole is a second magnet. The first magnet is held at the first hole in the lamp base by the first terminal with its north end facing through the first hole to the outside of the lamp base. Similarly, the second magnet is held at the second hole by the second terminal with its south end facing through the second hole of the lamp base. The terms "north" and "south" are used herein in the context of magnets and their poles, that is, the terms north and south referring to the natural magnetic orientation of a magnet when free to orient itself, to move with one end closer to the magnetic north pole or to the magnetic south pole of the earth, respectively.

There may be two limiters carried by the lamp base by the two holes. These limiters limit movement of the first magnet and the second magnet further into the lamp base.

The first terminal and the second terminal prevent movement of the first magnet and the second magnet through the first and second holes to the outside of lamp base. Thus, the two magnets are at the holes in the lamp base and their forward movements to the outside of the lamp base and inward into the lamp base are limited or constrained.

The present lamp also includes a lamp housing that receives the lamp base. The lamp housing includes a third terminal and a fourth terminal held in position in the lamp housing.

The lamp housing also includes a third magnet and a fourth magnet. The third magnet is held so that its south end faces the two holes in the lamp base, and the fourth magnet is held so that its north end faces the two holes in the lamp base. Accordingly, when the lamp base is inserted into the lamp housing, the first magnet of the lamp base and the third magnet of the lamp housing will attract as will the second magnet of the lamp base and fourth magnet of the lamp housing, when they are aligned and in proximity. If the lamp base is rotated so that the first magnet and the fourth magnet approach each other, and the second magnet and the third magnet are approaching each other, the third and fourth magnets will repel and electrical contact will not be made. The user may sense this magnetic repulsion when moving the lamp into the lamp housing and rotate the lamp with respect to the lamp housing so that the opposing north-south faces of the magnets are aligned and thus attract. When attractively aligned, the lamp base of the lamp will seat in the lamp housing.

The magnetic attraction between the first magnet and third magnet and between the second magnet and fourth magnet also enable an electrical circuit to be completed from the lamp housing between the lamp base through the first and third terminals and the second and fourth terminals and thence to the first and second electrical contacts of the cluster so that electrical current passes from the lamp housing to the lamp base and to the LEDs, and also for the lamp base to be held in place in the lamp housing physically, by the magnetic attraction of the paired magnets.

The magnets are selected to provide an attractive force so that, when the lamp housing is affixed to the ceiling of a room, for example, and the lamp base is inserted up into the lamp housing, the lamp base may be held fast solely by magnetic attraction, and no other attachment means is used to help hold the lamp in place.

The first magnet, second magnet, third magnet and fourth magnet are constrained in the lamp base and lamp housing and are not immovable. In the lamp base, the limiters permit limited movement of the first magnet and second magnet so that they, in response to magnetic repulsion from the fourth magnet and third magnet, respectively, can move slightly, thereby leaving a space between the corresponding magnets so that no electrical circuit is formed across the terminals (and the lamp base is not able to seat in the housing against the magnetic repulsive forces). The limiters prevent the first and second magnets from being removed from the holes in the lamp base and lamp housing.

The present limiters are flexible posts arranged in pairs, one pair of posts being associated with each magnet in the lamp base. A magnet may be inserted into position by pushing it between the adjacent posts. The posts, being flexible and formed so that their surfaces are forced outwardly by the leading edges of the magnet, bend resiliently to permit the magnet to be inserted between the posts and into position. The posts spring back resiliently when the magnet is seated against its terminal. Stops, which are configured areas of the inside surfaces of the posts prevent withdrawal of the magnets in the reverse direction after the magnets have been fully inserted between their respective posts and past the stops. Stops are located to allow the magnets to move a short distance in response to magnetic repulsion and thereby avoid electrical contact with magnets of like polarity.

An aspect of the disclosure is that the first terminal, the second terminal, the third terminal, and the fourth terminal may be made of beryllium copper alloy.

Another aspect of the disclosure is that the first magnet, the second magnet, the third magnet and the fourth magnet may be made of nickel-plated neodymium.

An another aspect of the disclosure is a junction box connected to the lamp housing by a bridge. The junction box may contain electrical connections from the electrical wiring of the housing to local electrical cables that supply electricity for the lamp, and may include a rectifier for converting alternating current to direct current of a particular polarity. Alternatively, the lamp housing may receive an electric conduit to be connected directly with the electrical wiring from the housing.

The advantages and features of these and other aspects of the disclosure will be apparent to those skilled in the art of lighting from a careful reading of the following detailed description, accompanied by the drawings.

BRIEF DESCRIPTION OF THE DRAWINGS

In the figures.

DETAILED DESCRIPTION

Figure 1:
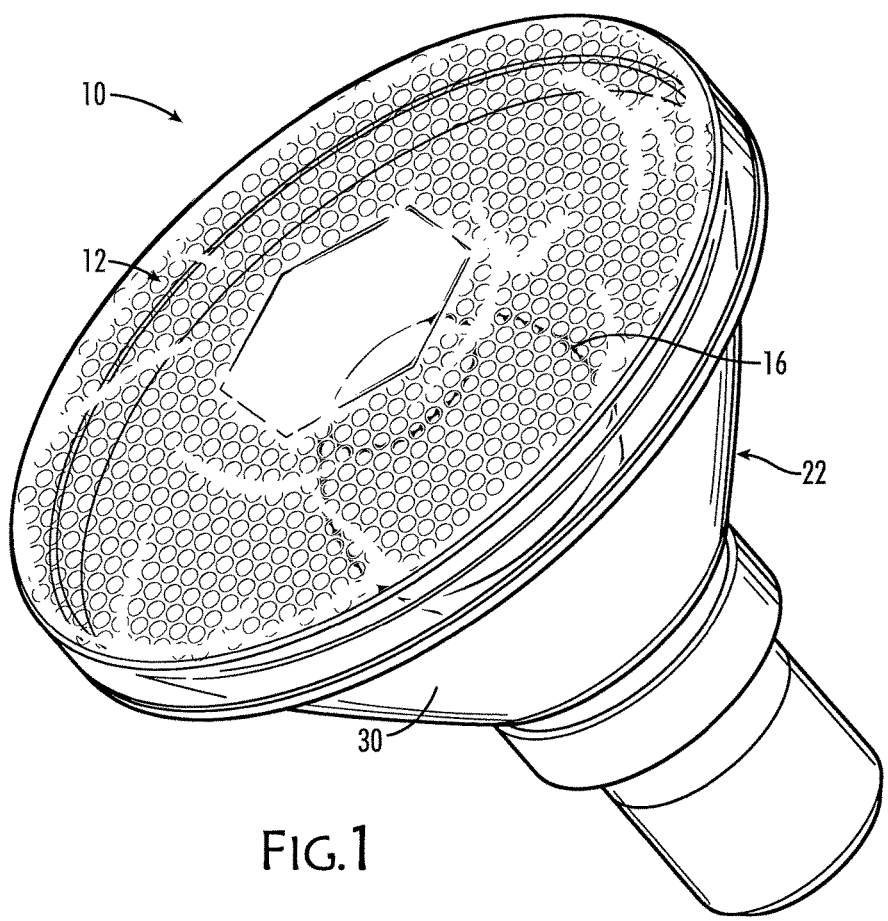
FIG. 1 is a lower perspective view of a ceiling mounted LED lamp and lamp base, according to an aspect of the disclosure.

Described herein are magnetic electrical connectors that serve as electrical contacts, such as between a lamp and a lamp housing, with correct polarity, when lighting uses direct current, and to hold the lamp securely in the lamp base. The lamp and lamp base may take the form of any of a variety of lights, including table lamps, floor lamps, wall lamps, ceiling lamps, and recessed ceiling lamps.

Referring now to the figures, a lamp, generally indicated in the accompanying drawings as lamp 10, and best seen in FIGS. 1-4, includes a cover 12, a lens 16, a plurality of light emitting diodes, referred to herein as cluster 14, and a lamp base 22. Lens 16 diffuses light from cluster 14. A lamp housing 26 is configured to receive lamp 10 and is best seen by itself in FIGS. 5-8 and is seen together with lamp 10 in FIGS. 9-11.

Figure 2:
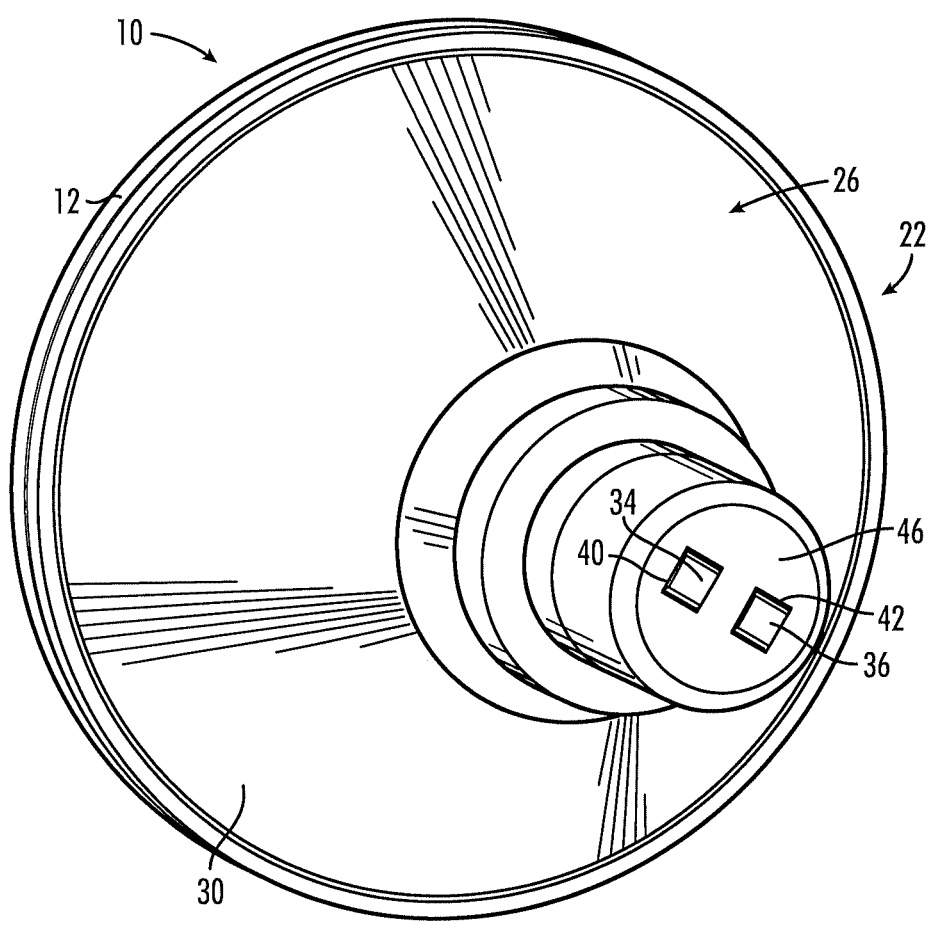
FIG. 2 is an upper perspective view of an LED lamp and lamp base of FIG. 1, according to an aspect of the disclosure.
Figure 3:
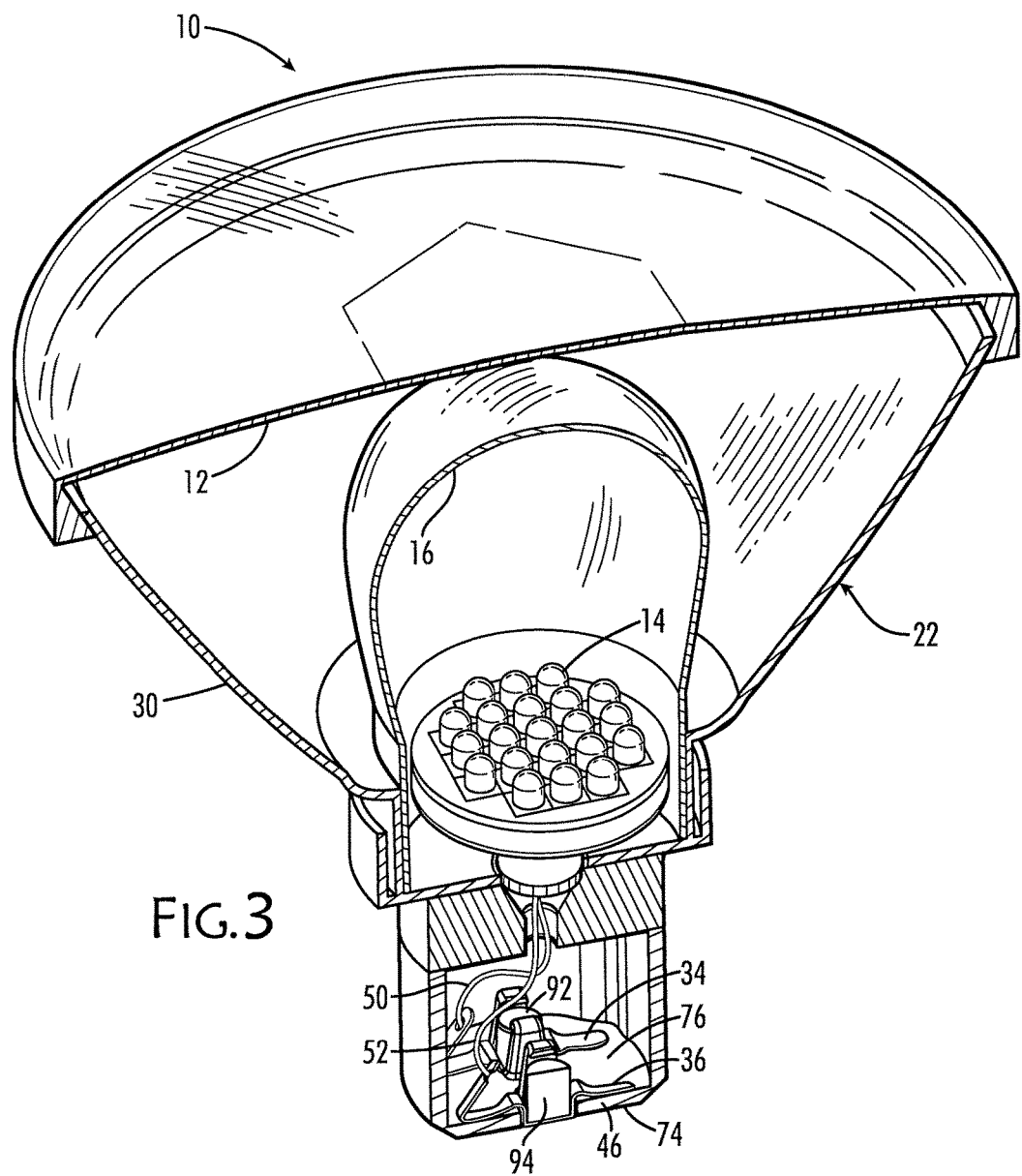
FIG. 3 is an lower perspective, cross-sectional view of the LED lamp and lamp base of FIG. 1, according to an aspect of the disclosure.
Figure 4:
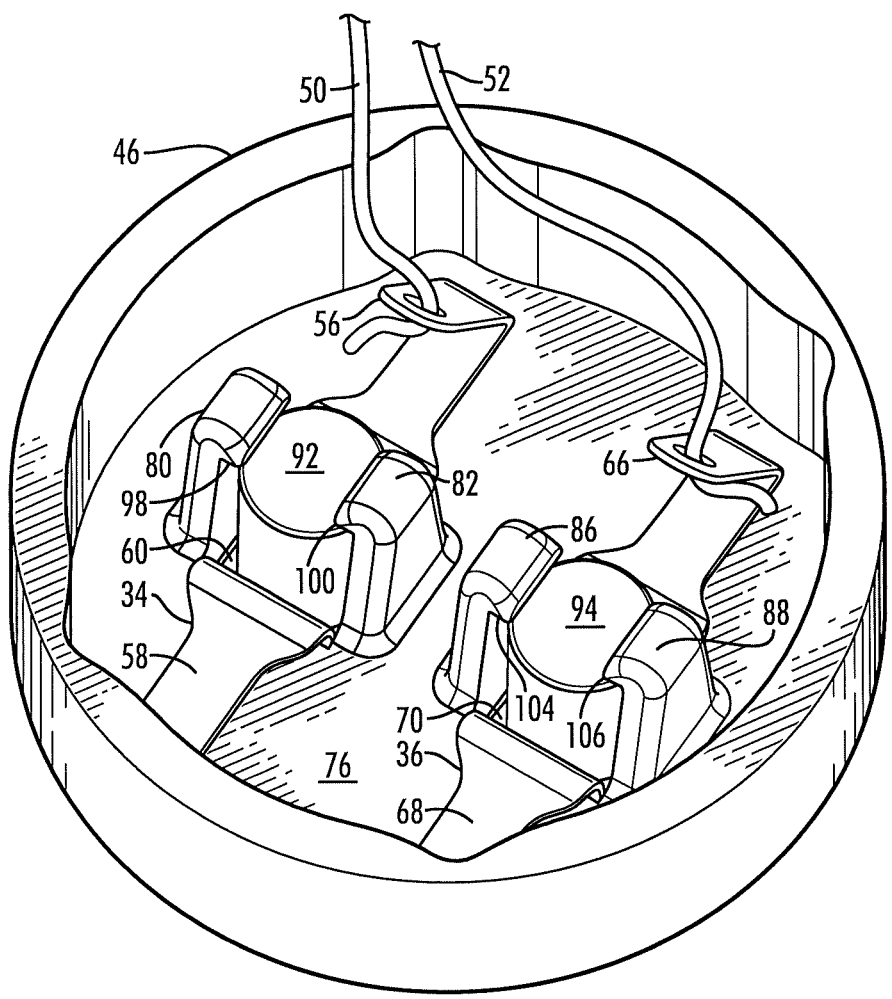
FIG. 4 is a perspective, detailed view of the bottom of the LED lamp base of FIG. 3, according to an aspect of the disclosure.

FIGS. 1-4 shows perspective views of lamp 10. If lamp 10 is a ceiling-mounted lamp, such as a flood light, then the view of lamp 10 in FIG. 1 is a bottom perspective view when viewed by a person from below lamp 10. FIG. 2 shows a top perspective view of a lamp base 22 of lamp 10. FIG. 3 shows a cross-sectional perspective view of lamp base 22, and FIG. 4 shows a detailed view of a portion of FIG. 3.

A cover 12 is seen in FIGS. 1 and 3 and its edge is visible in FIG. 2. Cover 12 covers the end of lamp 10 and may be clear, transparent so light shines through it. A lens 16 is visible through cover 12 in FIG. 1 and seen in FIG. 3 where a portion of cover 12 is cut away. In FIG. 3, lens 16 covers and protects a cluster 14 of light emitting diodes (LEDs). A "cluster" of LEDs means that a plurality of LEDs are grouped in an arrangement and connected electrically in a way that provides a first conductor 50 and an opposing second conductor 52 which can be connected to a source of electricity in order to light the LEDs that are part of, or elements of, cluster 14. The LEDs in cluster 14 may be connected in series, in parallel or in a combination of series and parallel. Cluster 14 may comprise surface-mounted LEDs to facilitate assembly, interconnection, and handling.

Cluster 14 uses direct current rather than alternating current. An adaptor 18 is shown connected to cluster 14 that may receive alternating current such as 115 volts AC and adapt it for use by cluster 14, such as by rectification and stepping the voltage down to provide the voltage for cluster 14.

Lamp base 22 is shown in perspective in FIGS. 1, 2, 3, and 4. Lamp base 22 may have a frustro-conical shape so that it may serve as a reflector, redirecting light from cluster 14 through cover 12. Lamp base 22 also reduces lamp 10 to a smaller profile in order to fit into lamp housing 26, as will be described more fully below. Lamp base 22, from the exterior perspective view of FIG. 2, has a first terminal 34 and a second terminal 36 that are visible through a first hole 40 and a second hole 42, respectively, formed in the bottom 46 of lamp base 22. First terminal 34 and second terminal 36 make electrical contact with equivalent contacts in lamp housing 26, via adaptor 18.

Internally, and best seen in FIGS. 3 and 4, lamp base 22 holds cluster 14 in position to direct light through lens 16 and cover 12, and is in electrical connection with first terminal 34 and second terminal 36 via adaptor 18 and a first conductor 50 and a second conductor 52, respectively. First conductor 50 and second conductor 52 may be insulated, electrically-conducting wires. When a direct electrical current is received across first terminal 34 and second terminal 36, and passes from there through first conductor 50 and second conductor 52, respectively, to cluster 14, the LEDs in cluster 14 produce light that shines through lens 16 and cover 12 of lamp 10.

First terminal 34 and second terminal 36 may be made of electrically conductive metal, such as copper, silver, gold, iron, aluminum, or a metal alloy, such as steel or a copper alloy such as beryllium copper alloy. First terminal 34 and second terminal 36 may have different shapes and be formed so as to fit in lamp base 22 conveniently. First terminal 34 and second terminal 36 cross first hole 40 and second hole 42, respectively, for reasons to be presented below.

First terminal 34 and second terminal 36 may conveniently be made of strips of metal. First terminal may have a first arm 56 and an opposing first foot 58 with a first stepped section 60 therebetween that fits into first hole 40. First arm 56 may be bent or curved away from inside surface 76 of bottom 46 to facilitate attachment of first conductor 50 such as first conductor 50. First foot 58 may be flat so as to engage an inside surface 76 of bottom 46 of lamp base 22. Similarly, second terminal 36 has a second arm 66, an opposing second foot 68, and second stepped section 70 that fits in second hole 42. First arm 56 and second arm 66 may have a hole formed therein to facilitate attachment of first conductor 50 and second conductor 52, respectively. First foot 58 and second foot 68 help to balance first terminal 34 and second terminal 36 so that first terminal 34 and second terminal 36 remain in position in first hole 40 and second hole 42, respectively. Second terminal 36 may have a second stepped section 70.

First stepped section 60 and second stepped section 70 are portions of first terminal 34 and second terminal 36, respectively, that are displaced laterally with respect to first arm 56, second arm 66, first foot 58 and second foot 68, and from the balance of the plane of first terminal 34 and second terminal 36, respectively, so first stepped section 60 and second stepped section 70 seat easily in first hole 40 and second hole 42, respectively. By being seated in first hole 40 and second hole 42, it is meant that first and second stepped sections 60, 70, are held below inside surface 76 when seen from outer surface 74 of bottom 46 and above outside surface 74 of bottom 46. Accordingly, the extent of the lateral displacement may be less than the thickness of the bottom 46 of lamp base 22, such as 0.25 mm from bottom 46 mm in order to protect against damage and provide tolerances for manufacturing.

First terminal 34 and second terminal 36 are springs, supported at their ends and not in the middle at stepped sections 60, 70 where they have a range of motion.

As best seen in FIG. 4 and also seen in FIG. 3, attached to the inside surface 76 of bottom 46 are a first post 80 and a second post 82 spaced apart from first post 80, and a third post 86 and a fourth post 88, also spaced apart. Between first post 80 and second post 82 is a first magnet 92; between third post 86 and fourth post 88 is a second magnet 94.

First post 80, second post 82, third post 86, and fourth post 88 are made of a resilient material, such as a resilient plastic, and are curved so that first magnet 92 can be seated between first post 80 and second post 82, and second magnet 94 can be seated between third post 86 and fourth post 88. By pushing down on first magnet 92 when it is positioned between first post 80 and second post 82, first post 80 and second post 82 will resiliently move laterally out of the way of first magnet 92 as it seats between them. Likewise, third post 86 and fourth post 88 are also resilient and will move laterally to give way for second magnet 96 to be seated in position between them.

First post 80 and second post 82 also have stops 98 and 100, respectively, that limit vertical travel of first magnet 92, after it is in position between first post 80 and second post 82. After first magnet 92 is pushed down between first post 80 and second post 82, first post 80 and second post 82 resiliently close over first magnet 92 so that stops 98 and 100 limit its upward movement. Downward movement of first magnet 92 is limited by first terminal 34 at first stepped section 60. Just as with first magnet 92, second magnet 94 may be put into place by pushing it down between third post 86 and fourth post 88 so that stops 102 and 104 close over second magnet 94 to limit its upward movement. Correspondingly, downward movement of second magnet 94 is limited by second terminal 36 at second stepped section 70.

Figure 5:
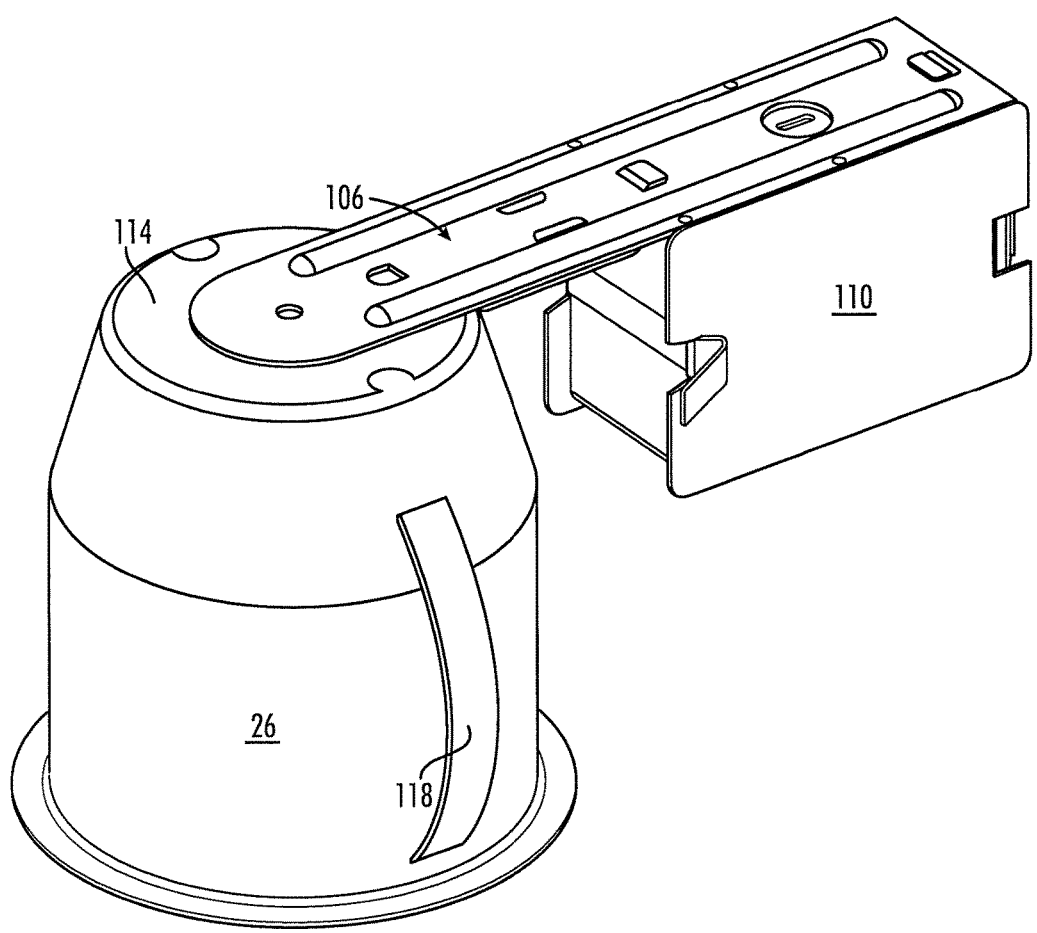
FIG. 5 is an upper perspective view of a lamp housing, junction box and bridge, according to an aspect of the disclosure.
Figure 6:
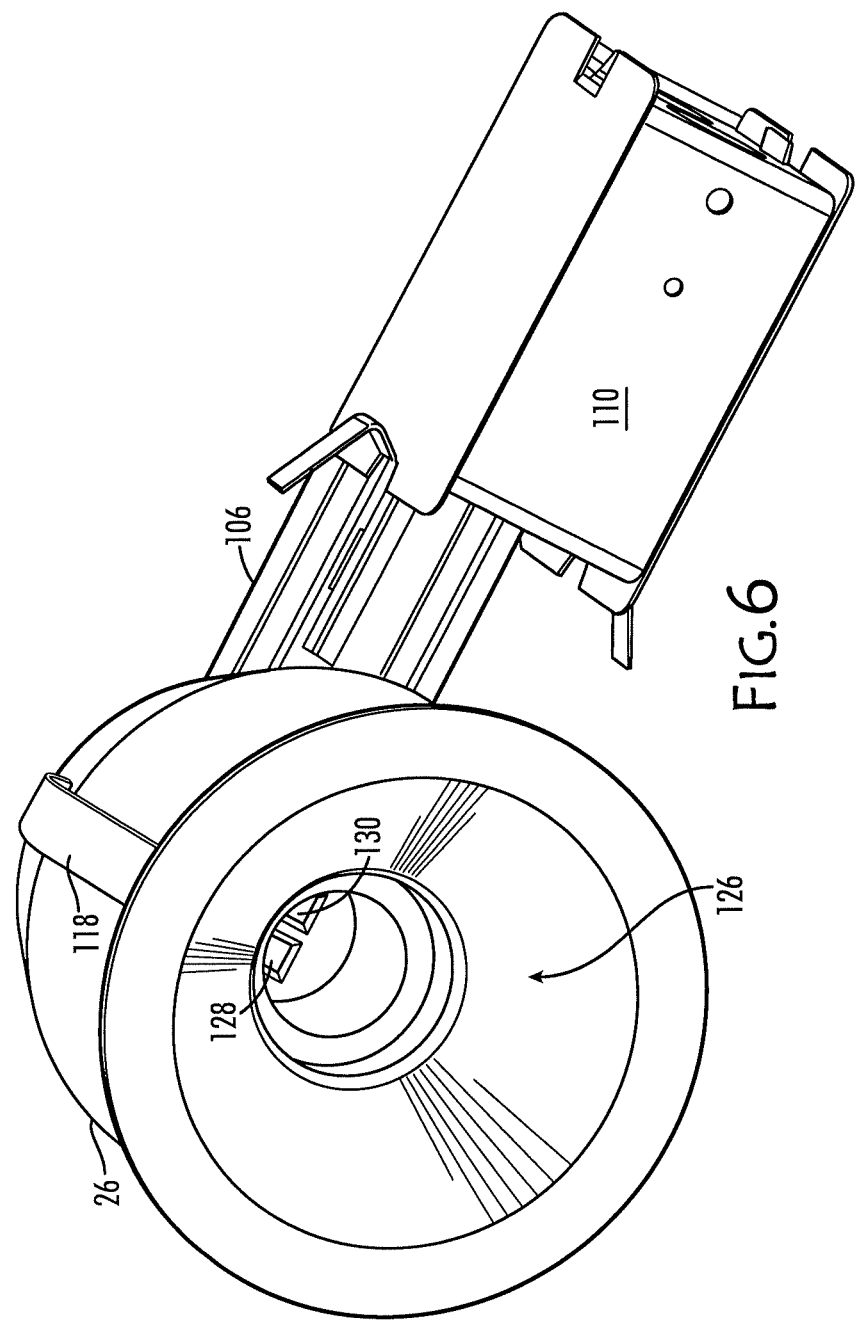
FIG. 6 is a lower perspective view of the bottom of the lamp housing and with a junction box and bridge, as shown in FIG. 5, according to an aspect of the disclosure.
Figure 7:
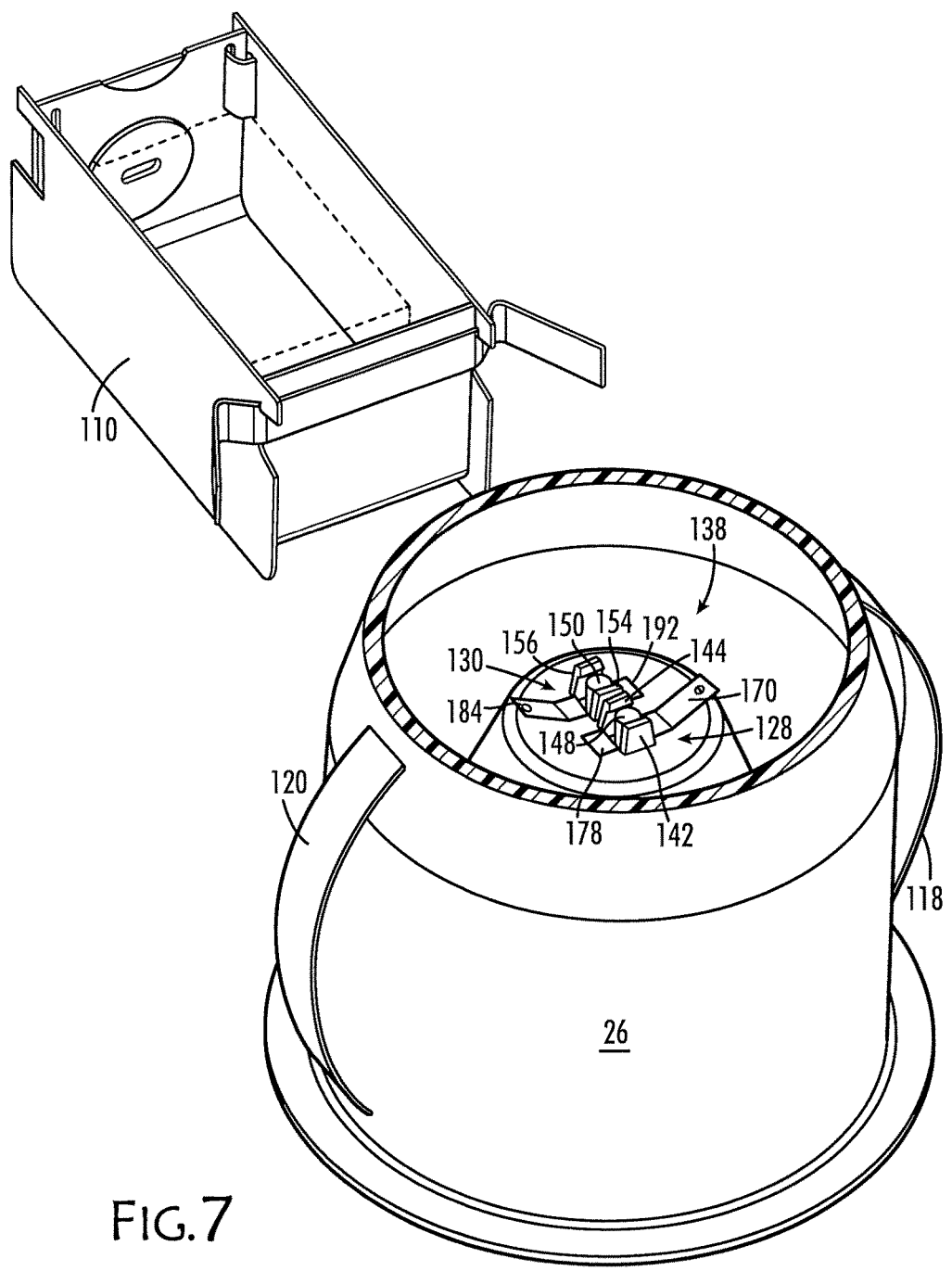
FIG. 7 is an upper perspective view of the lamp housing shown in FIG. 6 with the covers of the lamp housing and the junction box removed, according to an aspect of the disclosure.
Figure 8:
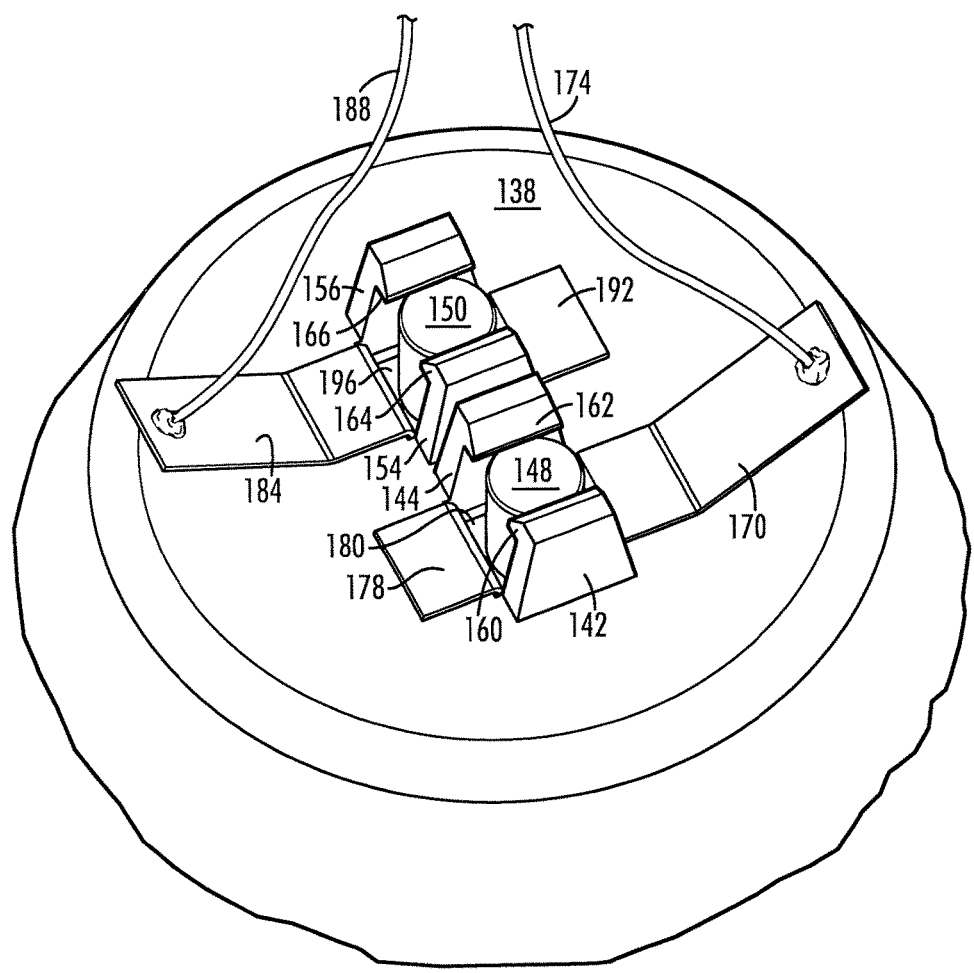
FIG. 8 is a detailed perspective view of the inside of the top of the lamp housing shown in FIG. 7, according to an aspect of the disclosure.

FIGS. 5, 6 and 7 show lamp housing 26 in perspective. FIG. 5 shows the top of lamp housing 26 with a bridge 106 and a junction box 110. Bridge 106 joins a junction box 110 to the top 114 of lamp housing 26. Junction box 110 houses the connection between lamp 10 and a local source of electric current. The local source of electric current may be alternating current delivered by a length of three-wire electrical cable or, alternatively, by a pair of wires from a source of direct current, such as a battery or a solar panel. The local source of electric current may be delivered by a conduit with magnetic repulsion connectors of the type shown herein and described more fully below, or as described in related U.S. Pat. No. 9,899,813 for a structural electric power distribution system and U.S. Pat. No. 9,614,322 for magnetic repulsion-based electrical connector.

Junction box 110 receives may contain devices generally indicated by a the dashed line in FIG. 7, to suggest a device 112 that might be used to adapt local power to match the power needs of lamp 10, such as a transformer that step down the voltage or a rectifier that convert alternating current to direct current if not present on lamp base 22 such as adaptor 18. Device 112 in junction box 110 may also protect lamp 10 from power surges or provide for several connections to the incoming power wiring. Wiring from junction box 110 then passes electric current to lamp housing 26 via bridge 106.

Lamp housing 26, if in the form of a recessed ceiling light as shown in FIG. 5, may have springs 118, 120, to hold it in place compressively in the ceiling. Springs 118, 120, deform against the sides of a hole formed in a ceiling for mounting lamp 10 and thereby apply pressure to the sides of the hole to help hold lamp 10 in place. On the bottom 124 of lamp housing is a recess 126, seen in FIG. 6. Recess 126 shaped to compliment the exterior shape of the lamp base 22 and thereby to receive lamp base 22 inside recess 126.

Inside lamp housing 26, are two terminals, namely, a third terminal 128 and a fourth terminal 130, which are partly visible in FIG. 6. In FIG. 7, top cover 134 of lamp housing 26 is removed so that an inner top surface 138 is visible. Inner top surface carries a third terminal 128 and a fourth terminal 130.

Third terminal 128 and fourth terminal 130 are similar to first terminal 34 and second terminal 36. Third terminal 128 is shown in detail in FIG. 8. Third terminal 128 has a fifth post 142 and a sixth post 144 with a third magnet 148 therebetween. Fourth terminal 130 has a seventh post 154 and an eighth post 156 with a fourth magnet 150 therebetween. Fifth post 142 and sixth post 144, resiliently deform in response to pressure, such as when third magnet 148 is pushed between fifth post 142 and sixth post 144. Seventh post 154 and eighth post 156, are also resilient and deform in response to pressure, such as when fourth magnet 150 is pushed between seventh post 154 and eighth post 156. Fifth post 142, sixth post 144, seventh post 154 and eighth post 156 have stops, namely, stops 160, 162, 164, and 166, respectively, that prevent third magnet 148 and fourth magnet 150 from being easily removed by limiting their respective upward movement.

Third terminal 128 and fourth terminal 130 may be configured in a manner similar to first terminal 34 and second terminal 36. Specifically, third terminal 128 has a third arm 170 to which a third electrical conductor 174 is connected, and have an opposing third foot 178 with a third stepped section 180 therebetween. Fourth terminal 130 likewise has a fourth arm 186, to which a fourth electrical conductor 188 is connected and an opposing fourth foot 192 with a fourth stepped section 196 therebetween.

Third stepped section 180 and fourth stepped section 196 are similar to first stepped section 60 and second stepped section 70.

Accordingly, the terminals in lamp base 22 and in lamp housing 26 are identical.

Figure 9:
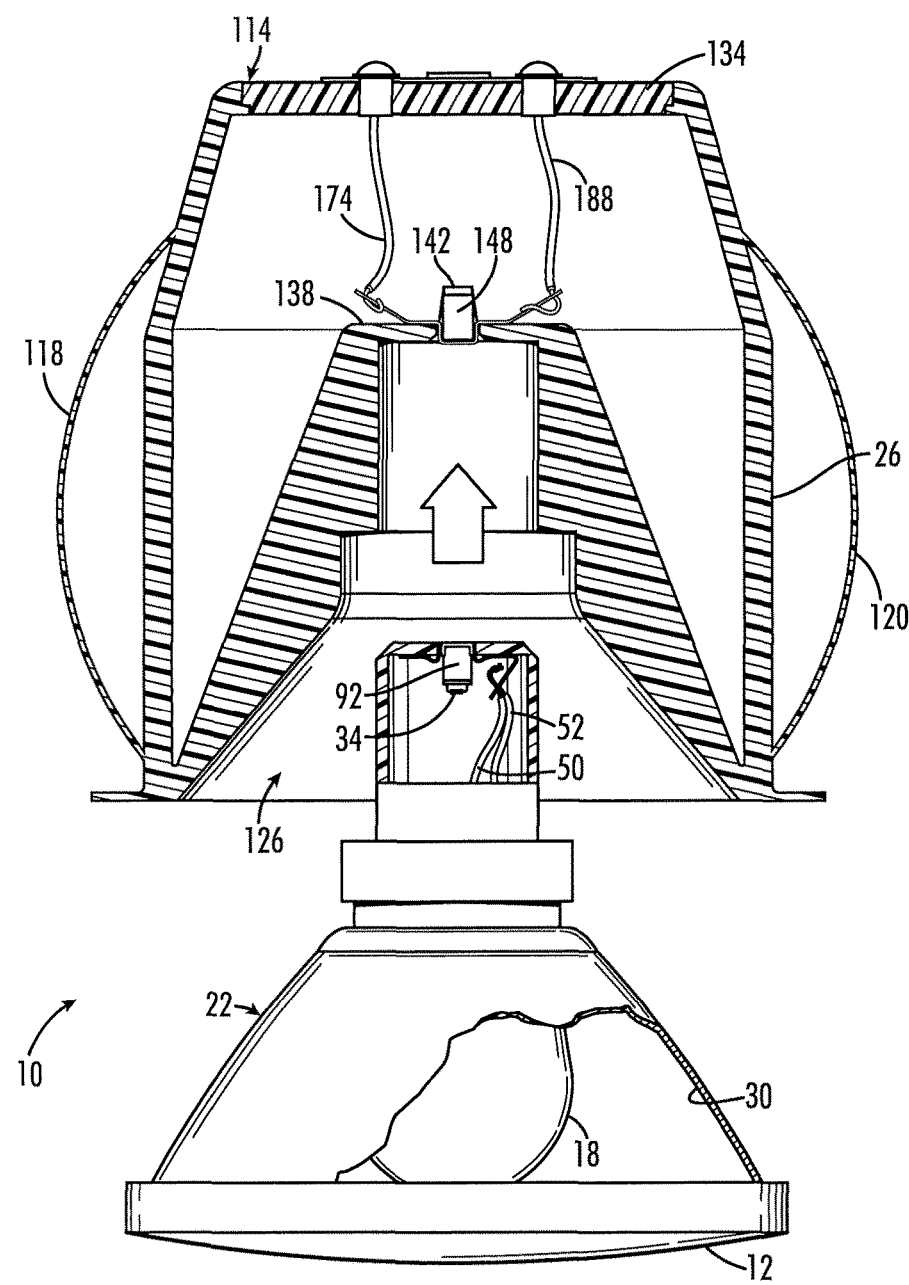
FIG. 9 is an exploded, side view of an LED lamp and lamp base, with lamp being partially cut-away and a cross-sectional view of an LED lamp housing, according to an aspect of the disclosure.

FIG. 9 shows an exploded view of lamp 10 and lamp housing 26. Lamp housing 26 is illustrated in cross-section and a portion of reflector 30 is cut away to reveal lens 16. Arrows indicate the direction of movement of lamp base 22 as it is being inserted into recess 126. First magnet 92 and third magnet 148 are aligned and oriented on the side that faces the viewer of FIG. 9; second magnet 94 and fourth magnet 150 are behind first magnet 92 and third magnet 148 and therefore not visible to the viewer of FIG. 9.

Figure 10:
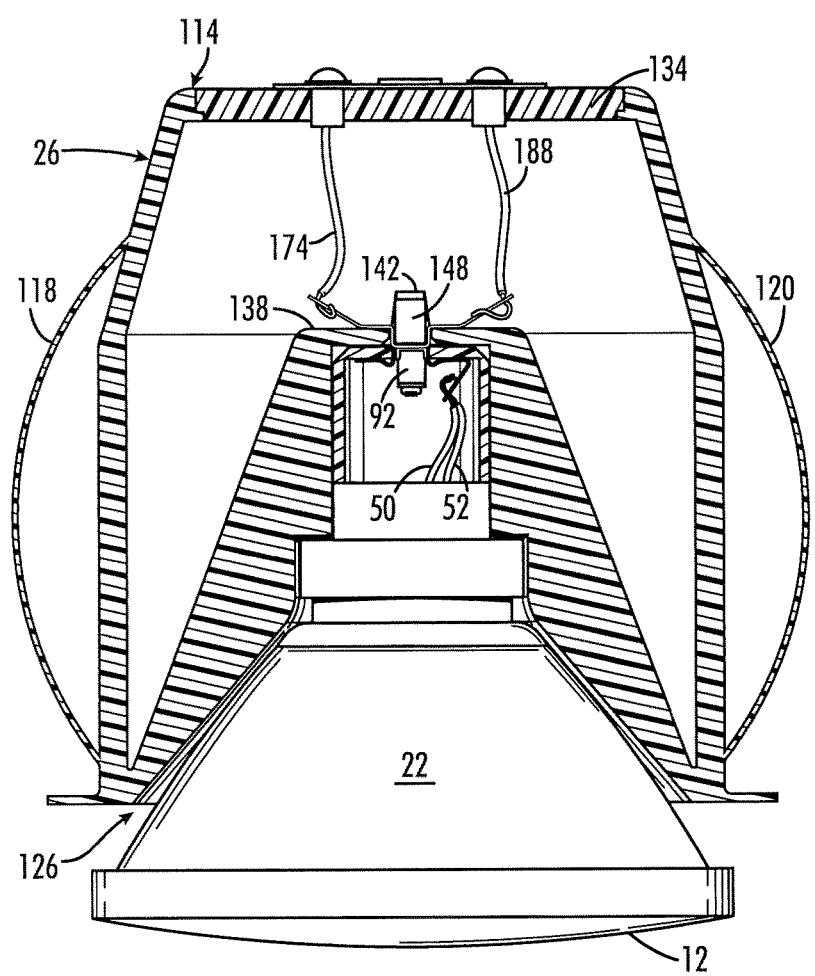
FIG. 10 is side, view of the LED lamp and cross-sectional view of a LED lamp housing of FIG. 9 shown joined, according to an aspect of the disclosure.
Figure 11:
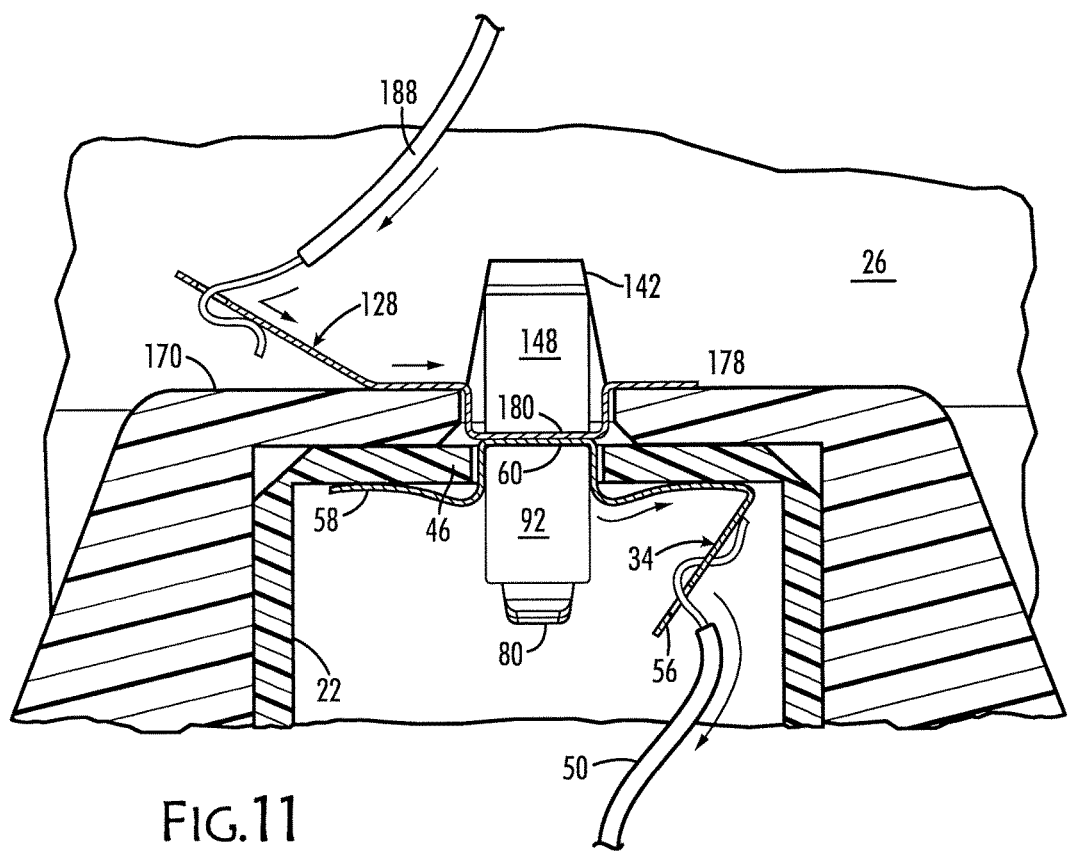
FIG. 11 is a detailed, side, cross-sectional view of the LED lamp and lamp housing shown in FIG. 10, according to an aspect of the disclosure.

In FIGS. 10 and 11, lamp 10 is shown seated in recess 126 of lamp housing 26. First magnet 92 moves toward third magnet 148 as a result of magnetic attraction. Accordingly, first terminal 34 and third terminal 128 are then brought into electrical connection, being pushed together between first magnet 92 and third magnet 148. Likewise, second magnet 94 also responds to magnetic attraction of fourth magnet 150 (neither second magnet 94 or fourth magnet 150 are visible in FIGS. 9 and 10), and move together accordingly, thereby bringing second terminal 36 into contact with fourth terminal 130 (also not shown in FIG. 11). Electricity then flows in the completed circuit from fourth electrical conductor 188 to fourth terminal 184 to second terminal 36 to second conductor 52 and thence to cluster 14. Cluster 14 is energized and current flows through first conductor 50 to first terminal 34 to third terminal 128 and finally to third electrical conductor 174.

Figure 12:
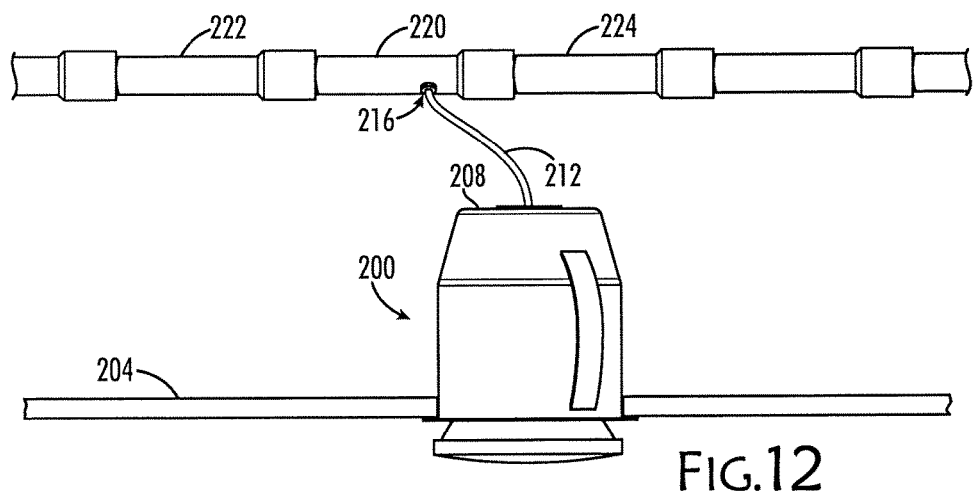
FIG. 12 illustrates a side view of an alternative electrical distribution system for a lamp, according to an aspect of the disclosure.

FIG. 12 illustrates a lamp 200 recessed into a ceiling 204. Lamp 200 is similar to lamp 10, illustrated previously in FIGS. 1-11. Electrical power is brought to top cover 208 of lamp 200 by a wire cable 212 extending from a hole 216 in a conduit 220. Conduit 220 is connected end-to-end with conduits 222 and 224. Wire cable 212 may runs through conduits 220, 222, and 224. Wire cable 212 may be similar to that sold under the trademark ROMEX, which is manufactured by Southwire Company, Inc.

Figure 13:
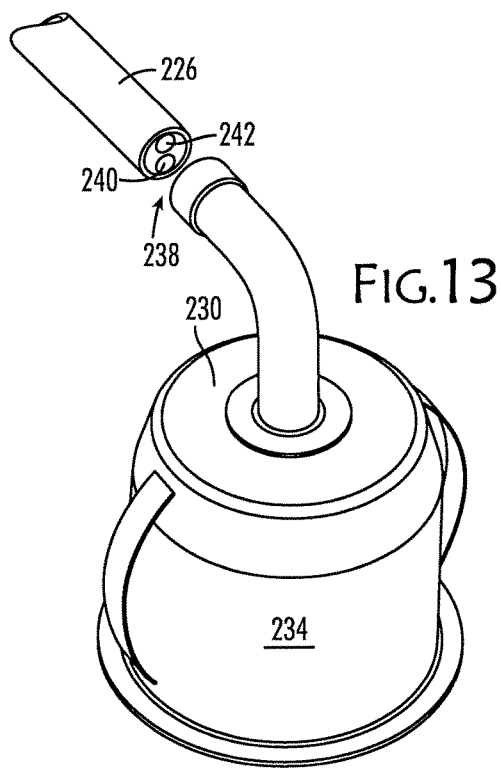
FIG. 13 is an upper perspective view of another alternative electrical distribution system for a lamp, according to an aspect of the disclosure.
Figure 14:
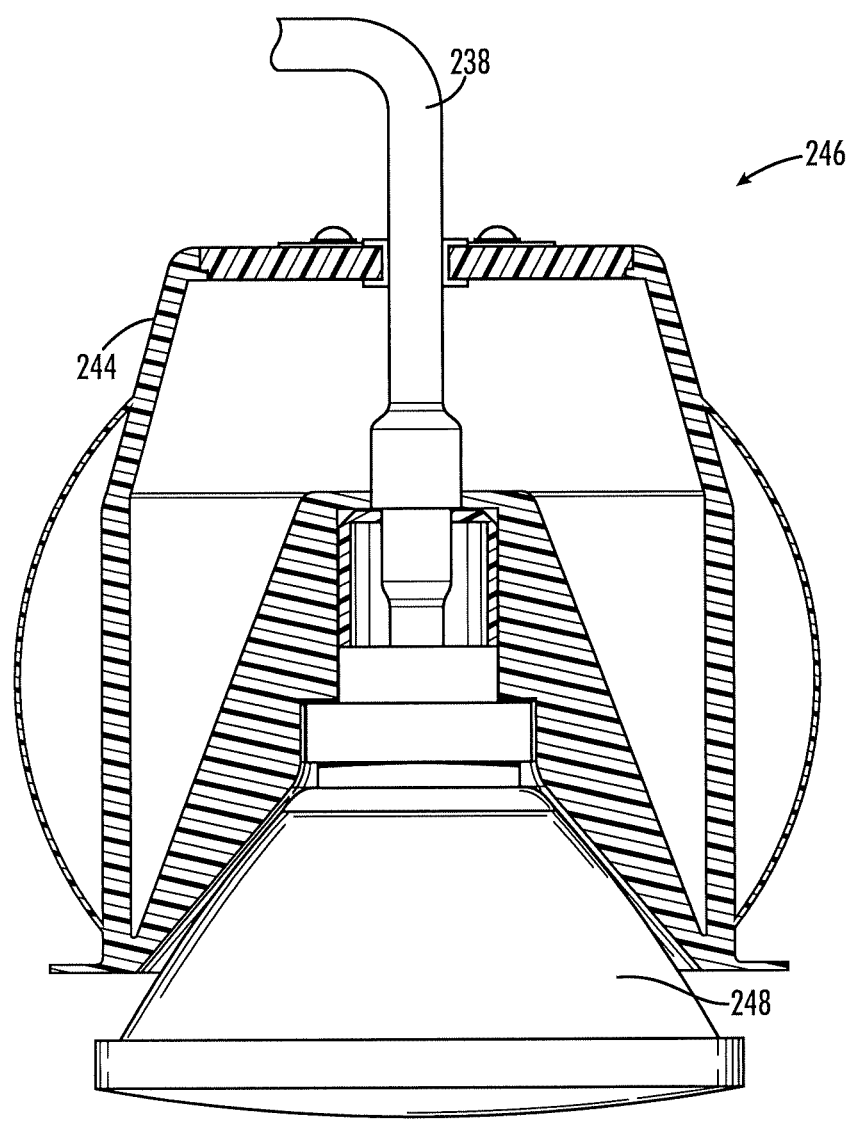
FIG. 14 is a side cross-sectional view of a portion of the conduit and lamp housing shown in FIG. 13 delivering electrical current from a conduit to a lamp housing and lamp using magnetic connectors of the type described herein.

In FIGS. 13 and 14, conduits 226, 228, run to a top cover 230 of a lamp 234. In FIG. 13, conduit 226 is shown separated from conduit 238 to reveal a first magnetic electrical connector 240 and a second magnetic electrical connector 242, inside conduit 226. First magnetic electrical connector 240 and second magnetic electrical connector 242, are as shown and described in U.S. Pat. Nos. 9,899,813; 9,614,322; and 8,936,472, which patents are commonly owned by the present applicant and are incorporated herein in their entireties by reference. First and second magnetic electrical connectors 240, 242, interact by magnetic repulsion to self-orient and establish an electrical connection from an electrical source to an electrical load.

FIG. 14 shows conduit 236 running directly into lamp housing 244 of lamp 246, where it is brought into connection with lamp base 248. Lamp base 248 may have terminals such as those described and shown in connection with FIG. 11 or may have magnetic electrical connectors such as those described in U.S. Pat. Nos. 9,899,813; 9,614,322; and 8,936,472, and as shown in FIG. 13. The former have non-magnetic terminals that establish an electrical connection with other similar non-magnetic terminals by the attraction of magnets of opposing polarity that press non-magnetic terminals together between the attracting magnets, as described above in connection with FIGS. 10 and 11. The latter have terminals containing magnets and which terminals are therefore attracted by magnetic forces of opposite polarity.

Inside lamp housing 244 of lamp 246, conduit 236 and the magnetic connectors self-orient and contact the non-magnetic terminals with the correct polarity to deliver direct electrical current to lamp base 248 for energizing a cluster of light-emitting diodes (not shown in FIG. 14). Accordingly, lamp 10 shown in FIG. 9 and lamp 246 of FIG. 14 are similar in that magnets are used to bring the source of electrical current and the load together with the correct polarity, and they differ in that the latter carries magnets inside the electrical terminal and the former uses magnets to push the electrical terminals.

Figure 15:
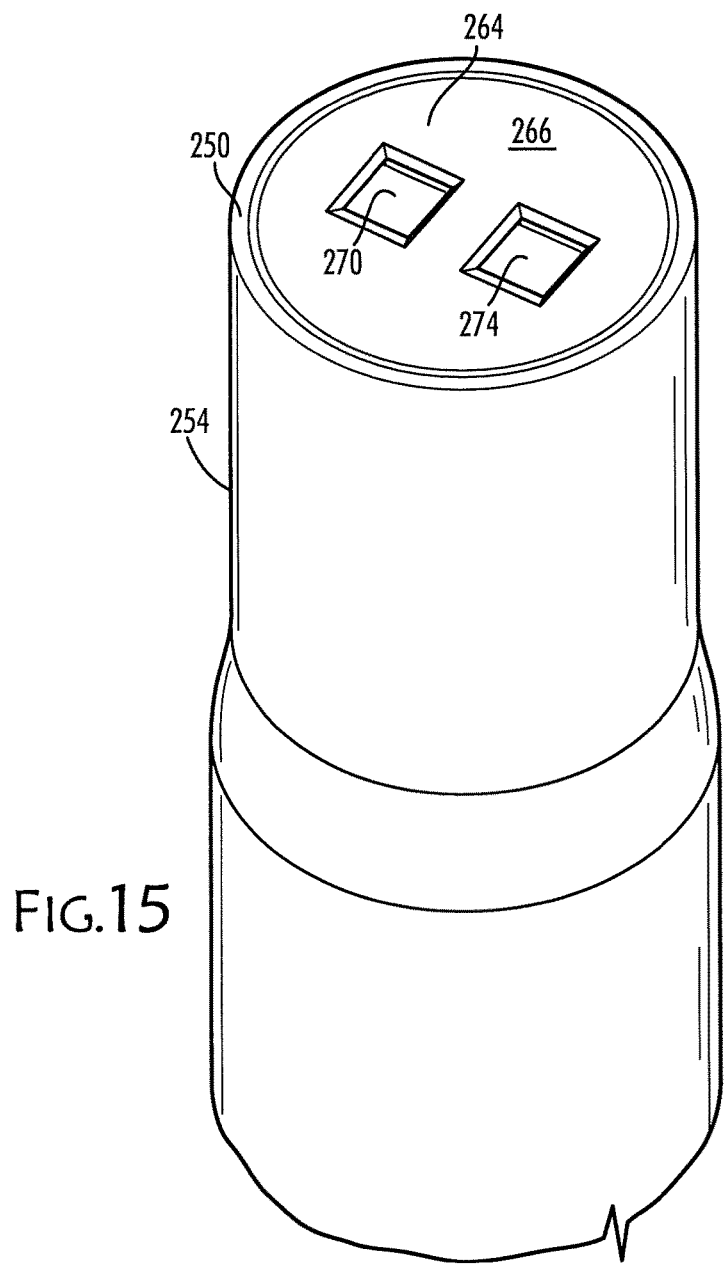
FIG. 15 is and end view of a conduit with an electrical connector flush-mounted in the end thereof, according to an aspect of the disclosure.
Figure 16:
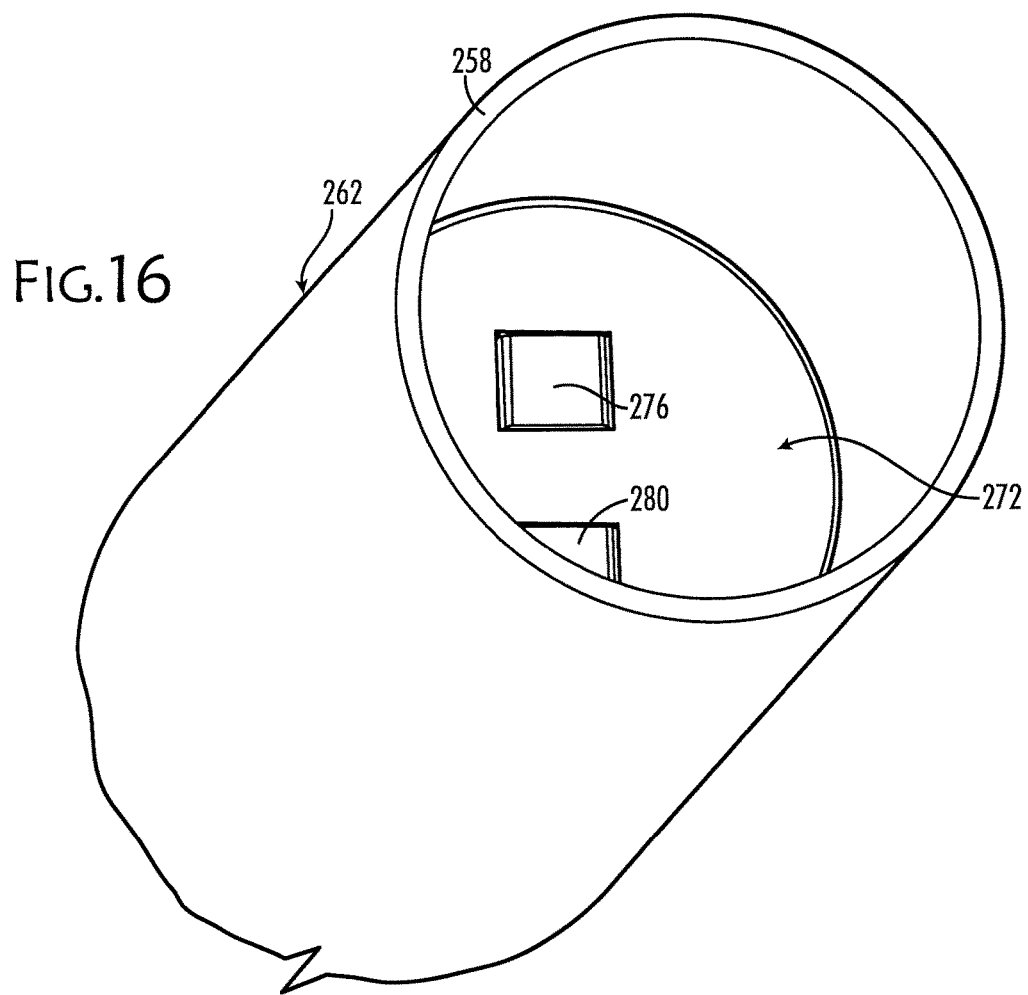
FIG. 16 is an end view of a conduit with an electrical connector recessed therein, according to as aspect of the disclosure.

Referring now to FIGS. 15 and 16, FIG. 15 shows a first end 250 of a first conduit 254. FIG. 16 shows a second end 258 of a second conduit 262. First end 250 of first conduit 254 has a reduced diameter receivable in second end 258 of second conduit 262. A first electrical connector 264 with a top surface 266 is positioned at first end 250 of first conduit 254, and may be positioned so that top surface 266 is flush with first end 250.

A second electrical connector 272 is recessed from second end 258 of second conduit 262, and, as shown in FIG. 16, so that first end 250 of first conduit 254 may be received inside second end 258 of second conduit 262.

First electrical connector 264 has a first terminal 270 and a second terminal 274, as shown in FIG. 15. As shown in FIG. 16, second electrical connector 272 has a third terminal 276 and a fourth terminal 280. When first conduit 254 is inserted into second conduit 262, and properly oriented, first electrical connector 264 can electrically connect to second electrical connector 272.

Figure 17:
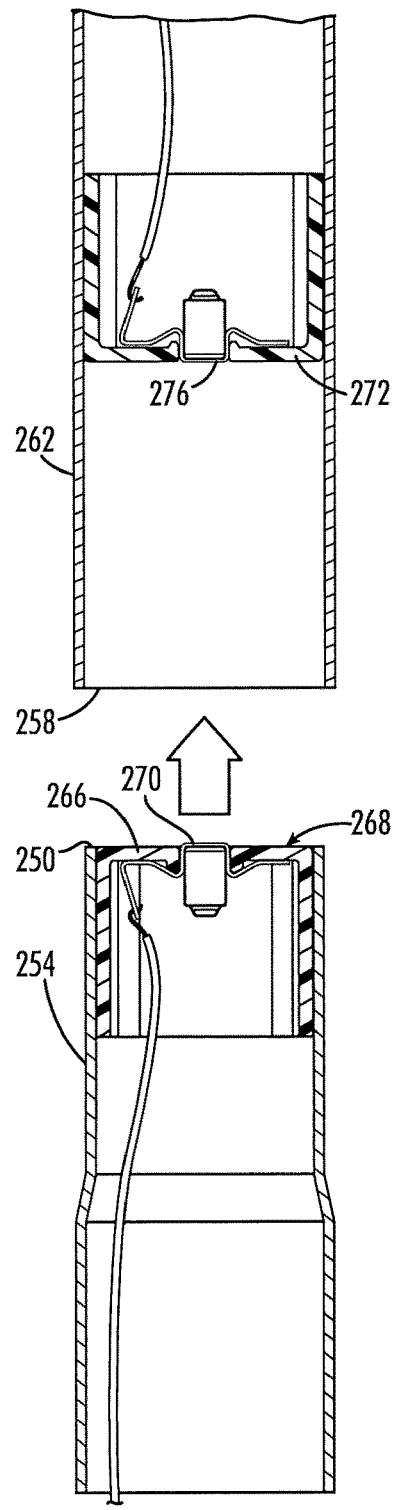
FIGS. 17, 18, and 19 show a series of views of two conduits being connected together to connect electrically for the transfer of electricity using magnetic connectors, according to an aspect of the disclosure.
Figure 18:
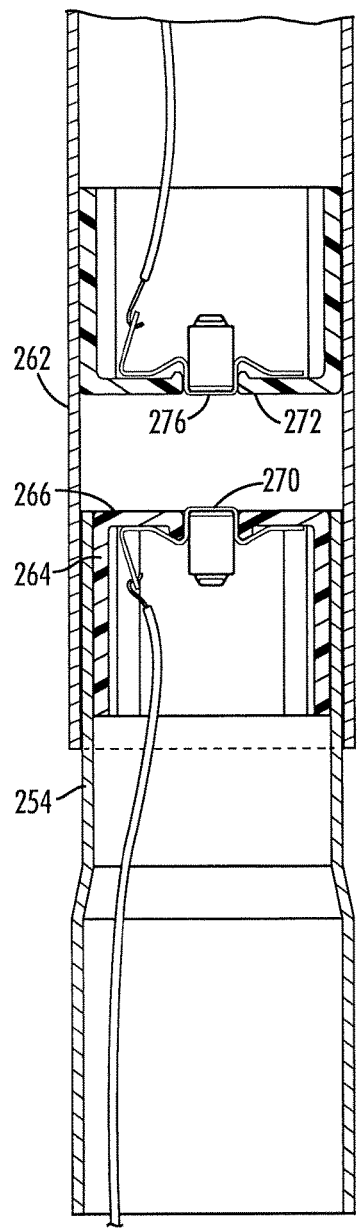
Figure 19:
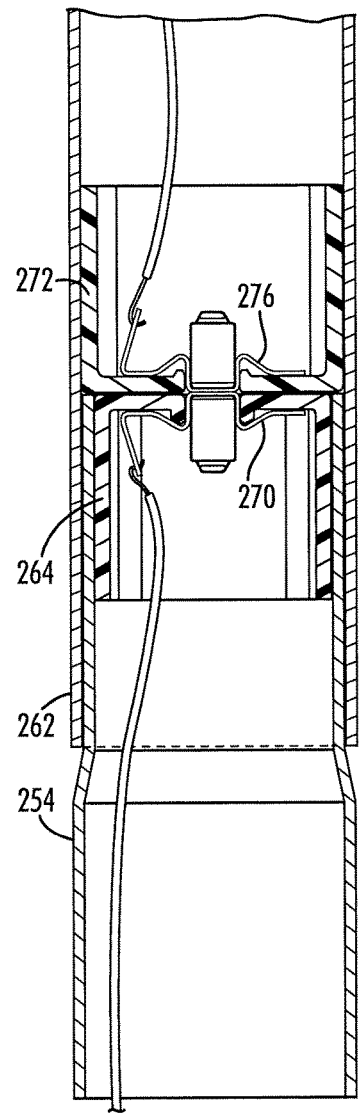

FIGS. 17, 18 and 19 show the process of electrically connecting first electrical connector 264 and second electrical connector 272 in stages, as first conduit 254 is inserted into second conduit 262. When first conduit 254 is fully seated in second conduit 262 and properly oriented, first terminal 270 of first conduit 254 comes into contact with third terminal 276 of second conduit 262, and second terminal 274 of first conduit 254 comes into contact with fourth terminal 280 of second conduit 262. When first conduit 254 and second conduit 262 are properly oriented, electricity passes from first terminal to third terminal and from second terminal 274 to fourth terminal 280.

Figure 20:
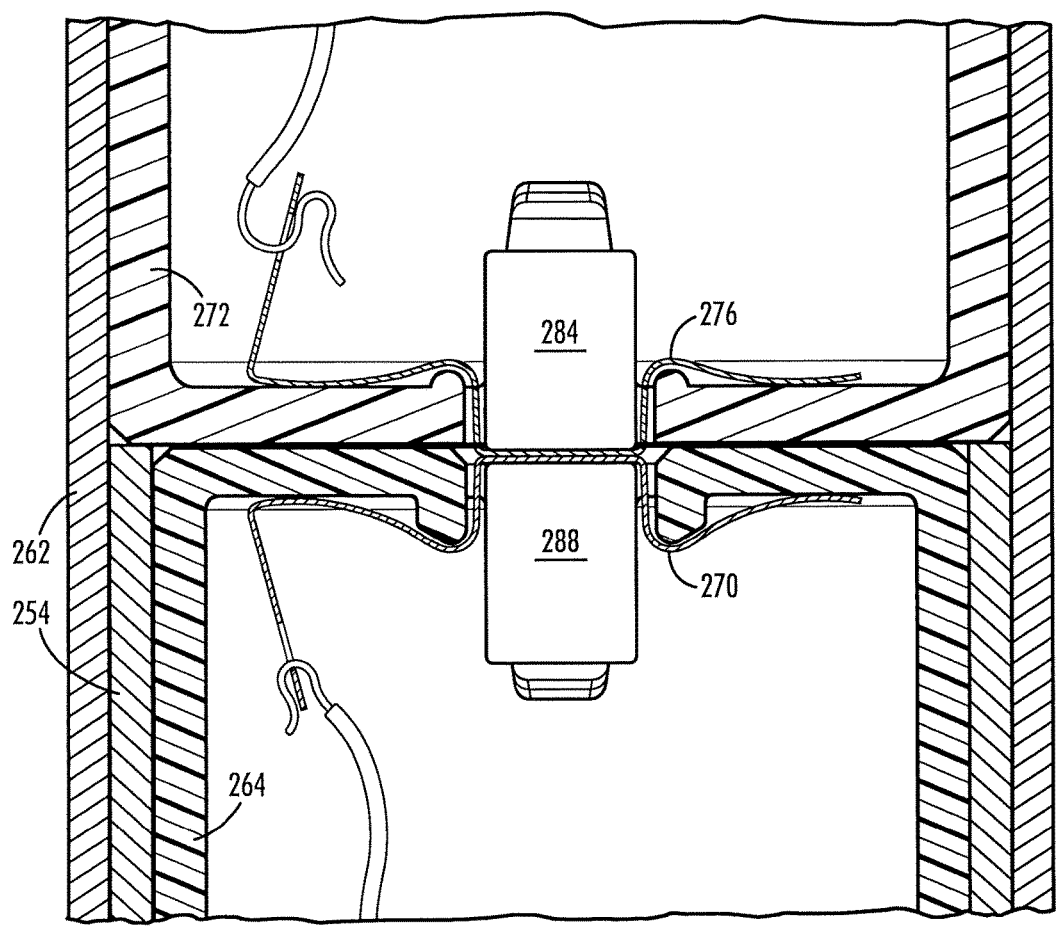
FIG. 20 is a detailed view of the connected conduits of FIG. 19 with magnetic connectors oriented to transfer electrical current, according to an aspect of the disclosure.
Figure 21:
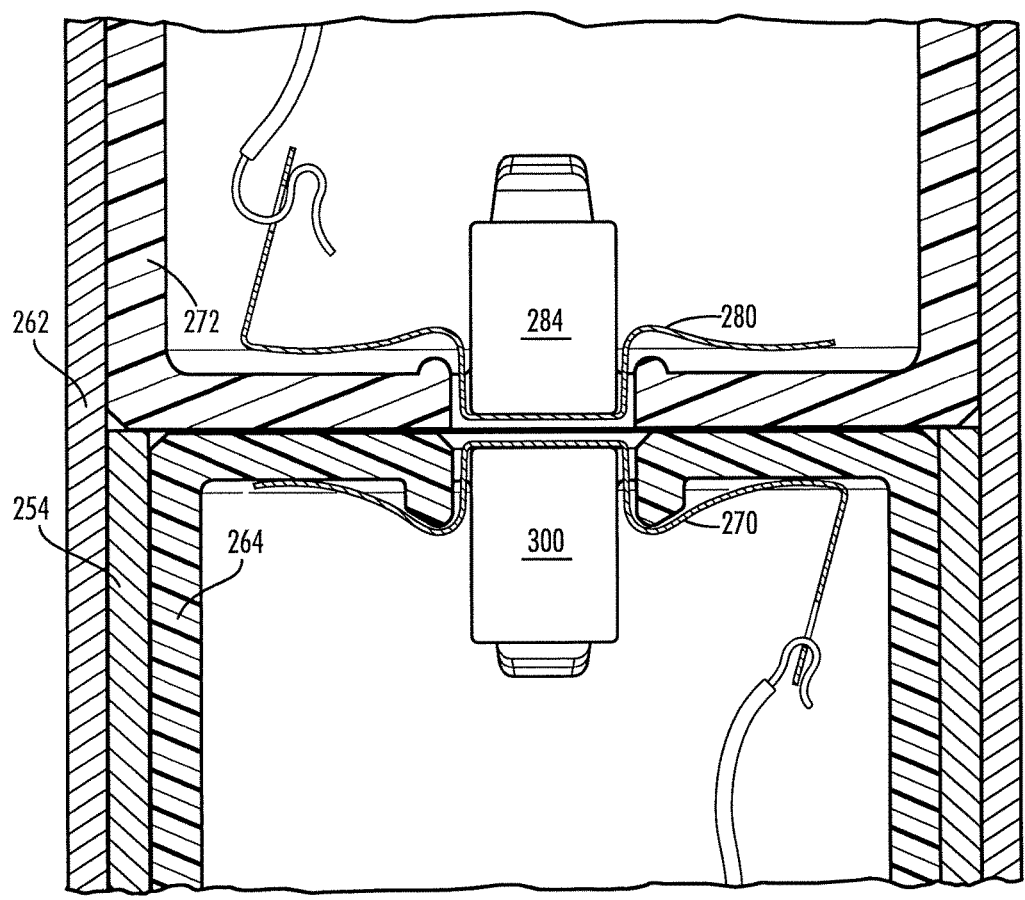
FIG. 21 is a detailed view of the conduits of FIGS. 17 and 18 comparable to FIG. 20 in that the conduits are joined and with their magnetic connectors repelling so as not to transfer electrical current, according to an aspect of the disclosure.

FIG. 20 and FIG. 21 show two orientations of first terminal 270 and second terminal 274 with respect to third terminal 276 and fourth terminal 280, respectively. When first electrical connector 264 is brought into contact with second electrical connector 272, as seen in FIG. 20, first magnet 284 and third magnet 288 are oriented so that their polarity is opposite (as are second magnet and fourth magnet, and which are not visible in FIG. 20). Accordingly, first magnet 284 and third magnet 288 attract and move together. With first terminal 270 and a third terminal 276 pressed together between first magnet 284 and third magnet 288, first electrical connector 264 and second electrical connector 272 are in electrical connection and can pass electrical current. Of course, if first magnet 284 and third magnet 288 are aligned to attract, second magnet and fourth magnets, which are not visible in FIG. 20, are also aligned to attract and therefore bring second terminal 274 and fourth terminal 280 into contact.

In FIG. 21, first electrical connector 264 and second electrical connectors 272 are not aligned. First terminal 270 of first electrical connector 265 is aligned with fourth terminal 280 of second electrical connector 272. Accordingly, first magnet 284 is aligned with fourth magnet 300, which has the same polarity as first magnet 284. First magnet 284 and fourth magnet 300 repel, and recede into first electrical connector 264 and second electrical connector 272. Rather than pressing first terminal 270 against fourth terminal 280, first terminal 270 and fourth terminal 280 remain separated and not in contact. Furthermore, when first terminal 270 is aligned with fourth terminal 280, second terminal 274 is aligned with third terminal 276 so second magnet 286 and fourth magnet 300 repel, too. Accordingly, no electricity passes.

Those skilled in the art of electricity distribution will appreciate that many substitutions and modification may be made in the foregoing description of aspects of the disclosure without departing from the spirit and scope of teachings presented.

What is claimed is:
1. A device, comprising:
 (a) a lamp having
  (i) a light source;
  (ii) a lamp base with a first hole and a second hole formed therein, said lamp base carrying said light source;
  (iii) a first terminal electrically connected to said light source and positioned at said first hole in said lamp base;
  (iv) a second terminal electrically connected to said light source and positioned at a second hole in said lamp base;

(v) a first magnet having a north end and a south end, said first magnet being held at said first hole in said lamp base by said first terminal with said north end of said first magnet facing toward said first hole, and wherein said first terminal is operable to prevent movement of said first through said first hole in said lamp base;

(vi) a second magnet having a north end and a south end, said second magnet being held at said second hole in said lamp base by said second terminal with said south end of said second magnet facing toward said second hole, and wherein said second terminal is operable to prevent movement of said second magnet through said second hole in said lamp base;

(vii) at least one first limiter operable to limit movement of said first magnet away from said first hole;

(viii) at least one second limiter operable to limit movement of said second magnet away from said second hole; and (b) a lamp housing operable to engage said lamp base, said lamp housing having a third hole and a fourth hole formed therein, said lamp housing having (i) a third terminal at said third hole;

(ii) a fourth terminal at said fourth hole;

(iii) a third magnet having a north end and a south end, said third magnet being held by said lamp housing with said south end facing said third hole; and (iv) a fourth magnet having a north end and a south end, said fourth magnet being held by said lamp housing with said north end facing said fourth hole, wherein, when said lamp base engages said lamp housing, said first magnet attracts said third magnet and repels said fourth magnet, and said second magnet attracts said fourth magnet and repels said third magnet to hold said first terminal against said third terminal and to hold said second terminal against said fourth terminal, and to pass an electrical current between said first terminal and said third terminal and between said second terminal and said fourth terminal, to light said light source.

2. The device of claim 1, wherein
said at least one first limiter holds said first magnet near said first hole; and
said at least one second limiter holds said second magnet near said second hole.

3. The device of claim 1, wherein
said at least one first limiter further comprises a first pair of posts adjacent to said first hole, said first magnet being held therebetween, said first pair of posts operable to limit movement of said first magnet away from said first hole; and
said at least one second limiter further comprises a second pair of posts adjacent to said second hole, said second magnet being held therebetween, said second pair of posts operable to limit movement of said second magnet away from said second hole.

4. The device of claim 1, wherein said first terminal, said second terminal, said third terminal, and said fourth terminal are made of beryllium copper alloy.

5. The device of claim 1, wherein said first magnet, said second magnet, said third magnet, and said fourth magnet are made of nickel-plated neodymium.

6. The device of claim 1, further comprising:
(a) a junction box;
(b) a bridge attached to said junction box and to said lamp housing; and (c) electrically conductive wiring running between said junction box to said third terminal and to said fourth terminal through said bridge.

7. The device of claim 1, further comprising:
(a) a junction box;
(b) a bridge attached to said junction box and to said lamp housing;
(c) a rectifier carried by said junction box operable to convert alternating current to direct current; and
(d) electrically conductive wiring carrying direct current and running from said rectifier in said junction box through said bridge to said third terminal and to said fourth terminal in said lamp housing.

8. The device of claim 1, wherein said light source is a light emitting diode.

9. A device, comprising:
(a) a first conduit with a first end;
(b) a second conduit with a second end;
(c) a first electrical connector in said first end of said first conduit, wherein said first electrical connector has a first hole and a second hole,
(d) a first terminal at said first hole and a second terminal at said second hole of said first electrical connector of said first conduit;
(e) a first magnet being held at said first hole and a second magnet being held at said second hole of said first electrical connector in said first conduit, wherein said first magnet has a north pole and a south pole with said north pole facing said first hole, and wherein said second magnet has a north pole and a south pole with said south pole facing said second hole;
(f) a second electrical connector in said second end of said second conduit, wherein said second electrical connector has a third hole and a fourth hole,
(g) a third terminal at said third hole and a fourth terminal at said fourth hole of said second electrical connector of said second conduit; and
(h) a third magnet being held at said third hole and a fourth magnet being held at said fourth hole of said second electrical connector in said second end of said second conduit, wherein said third magnet has a north pole and a south pole with said north pole facing said third hole of said second electrical connector, and wherein said fourth magnet has a north pole and a south pole with said south pole of said fourth magnet facing said fourth hole of said fourth terminal of said second electrical connector in said second end of said second conduit, wherein said first terminal of said first electrical connector and said fourth terminal of said second electrical connector are in electrical connection and said second terminal of said first electrical connector and said third terminal of said second electrical connector are in electrical connection, said north pole of said first magnet and said south pole of said fourth magnet holding said first terminal and said fourth terminal together, and said south pole of said second magnet and said north pole of said third magnet holding said second terminal and said third terminal together.

10. The device of claim 9, wherein said first conduit is a lamp base.

11. The device of claim 9, wherein said second conduit is a lamp housing.

12. The device of claim 9, wherein said first conduit is connected to an electrical source and said second conduit is connected to an electrical load.

13. The device of claim 9, wherein said first terminal further comprises a first limiter, said first limiter resisting movement of said first terminal away from said first hole and second terminal away from said second hole.

14. The device of claim 9, wherein said third terminal further comprises a third limiter, said third limiter resisting movement of said third terminal away from said third hole and said fourth terminal away from said fourth hole.

15. The device of claim 9, wherein said first terminal, said second terminal, said third terminal, and said fourth terminal are made of beryllium copper alloy.

16. The device of claim 9, wherein said first magnet, said second magnet, said third magnet, and said fourth magnet are made of nickel-plated neodymium.

17. The device of claim 9, further comprising a light source.

18. The device of claim 9, further comprising a light emitting diode.

* * * * *